(12) United States Patent
Konermann et al.

(10) Patent No.: US 8,315,833 B2
(45) Date of Patent: Nov. 20, 2012

(54) METHOD FOR CONTACTLESS CAPACITIVE THICKNESS MEASUREMENTS

(75) Inventors: Stefan Konermann, Remscheid (DE); Markus Stein, Gevelsberg (DE)

(73) Assignee: Plast-Control GmbH, Remscheid (DE)

( * ) Notice: Subject to any disclaimer, the term of this patent is extended or adjusted under 35 U.S.C. 154(b) by 378 days.

(21) Appl. No.: 12/664,975

(22) PCT Filed: Aug. 19, 2008

(86) PCT No.: PCT/EP2008/006811
§ 371 (c)(1),
(2), (4) Date: Dec. 16, 2009

(87) PCT Pub. No.: WO2009/027037
PCT Pub. Date: Mar. 5, 2009

(65) Prior Publication Data
US 2010/0256951 A1  Oct. 7, 2010

(30) Foreign Application Priority Data
Aug. 30, 2007  (DE) .......... 10 2007 040 940

(51) Int. Cl.
*G01B 7/02* (2006.01)
*G01B 11/02* (2006.01)
*G01B 13/02* (2006.01)

(52) U.S. Cl. ..................................... 702/170

(58) Field of Classification Search .............. 702/170
See application file for complete search history.

(56) References Cited

U.S. PATENT DOCUMENTS

| | | | | |
|---|---|---|---|---|
| 5,742,167 A * | 4/1998 | Haynes | .......... | 324/671 |
| 6,377,039 B1 * | 4/2002 | Goldfine et al. | .......... | 324/232 |
| 6,646,453 B2 * | 11/2003 | Muller et al. | .......... | 324/671 |
| 2005/0178663 A1 * | 8/2005 | Kobayashi | .......... | 204/403.01 |
| 2006/0152231 A1 * | 7/2006 | Konermann et al. | .......... | 324/662 |
| 2007/0001261 A1 * | 1/2007 | Tanaka | .......... | 257/532 |
| 2009/0281764 A1 * | 11/2009 | Raykhman et al. | .......... | 702/150 |

FOREIGN PATENT DOCUMENTS

| | | |
|---|---|---|
| EP | 1318376 A | 6/2003 |
| EP | 1681531 A | 7/2007 |

* cited by examiner

*Primary Examiner* — Michael Nghiem
(74) *Attorney, Agent, or Firm* — Richard M. Goldberg

(57) ABSTRACT

A method for contactless capacitive thickness measurement of a flat material (10) that is placed in the fringe field (32) of a capacitor (C1,C2), with simultaneous measurement of the width L of an air gap (16) between the flat material and the capacitor plates, in which the capacities $g_L$, $k_L$ of two capacitors (C1, C2) are measured whose fringe fields (32) decay at different rates towards the flat material (10), and in that both, the thickness D of the flat material (10) and the width L of the air gap (16) are determined on the basis of the condition that, for each capacitor (C1, C2), the measured capacity $g_L$, $k_L$ is equal to the integral of the capacity gradient g', k' over the thickness of the flat material (10).

11 Claims, 4 Drawing Sheets

METHOD FOR CONTACTLESS CAPACITIVE THICKNESS MEASUREMENTS

The invention relates to a method for contactless capacitive thickness measurements of a flat material that is placed in the fringe field of a capacitor, with simultaneous measurement of the width of an air gap between the flat material and the capacitor plates.

A method of this type is described in EP 1 681 531 A1. A typical example for an application of this method is the measurement and feedback-control of the film thickness in the process of extruding of flat films or film bubbles. Since the measurement takes place in the fringe field of the capacitor and, accordingly, both capacitor plates are located on the same side of the film, the measurements can readily be made also on closed film bubbles. A contactless measurement has the advantage that the film surface is prevented from damage because a certain air gap is always present between the measuring head carrying the capacitor plates and the film surface. In this case, however, the measured capacity is dependent not only on the film thickness but also on the width of the air gap, because the fringe field becomes weaker with increasing distance from the capacitor. For this reason, in order to be able to calculate the thickness of the film from the measured capacity, the width of the air gap must also be measured. To this end, the known method requires an additional optical sensor.

EP 1 318 376 A2 discloses a method wherein the capacities of two capacitors are measured which differ in their plate distance, so that their fringe fields become weaker at different rates with increasing distance from the capacitors. The thickness of the film is calculated from the quotient between these two measured capacities. Since this quotient is largely independent from the dielectric constants of the film material, the material composition need not be known for the measurement. This method is however not suitable for a contactless measurement when the width of the air gap is not known, because the quotient of the capacities is not dependent on the width of the air gap.

It is an object of the invention to provide a method which permits an easier contactless measurement of the film thickness.

This object is achieved with a method of the type indicated above, wherein the capacities of two capacitors are measured, the fringe fields of which decay with different rates towards the flat material, and wherein both, the thickness of the flat material and the width of the air gap are determined on the basis of the condition that, for each capacitor, the measured capacity is equal to the capacity gradient integrated over the thickness of the flat material.

In this context, the capacity gradient is defined as follows: If a foil directly engages the capacitor plates with one side, then the measured capacity is a function of the film thickness, i.e. the distance x between the capacitor plates and the surface of the film facing away from the capacitor. Then, the capacity gradient is defined as the derivative of this function with respect to x. The measured capacity is the integral of this capacity gradient over the thickness of the flat material. This relation is generally valid also for the case that the flat material does not directly engage the capacitor but is separated therefrom by an air gap. In this case, the integral over the thickness of the flat material is defined as the integral over the distance x, with the surface of the flat material facing the capacitor as lower integration boundary and the surface facing away from the capacitor as upper integration boundary.

Since the capacities of two capacitors with different capacity gradients are measured, each of the capacities has to be equated to a corresponding integral in which the length of the integration interval indicates the thickness of the flat material whereas the locus of the lower integration boundary indicates the width of the air gap. Thus, one obtains two independent equations which, under certain conditions which are however generally fulfilled in practice, permits to calculate the two unknowns, i.e. the thickness of the flat material and the width of the air gap. Thus, no additional sensor means are needed for measuring the width of the air gap.

The invention also relates to a device suitable for carrying out this method.

Useful further developments of the invention are indicated in the dependent claims.

When the capacity gradients of the two capacitors can at least approximately be described by algebraic function terms, e.g. polynomials, the corresponding integrals are also given by algebraic terms, and the system of equations can be solved algebraically.

According to another embodiment, the equation system is solved numerically. This may be done for example in the way that the two integrals are at first calculated numerically for a certain width of the air gap which is assumed to be known, and then the width of the air gap is varied until both integrals are equal to the measured capacities. In this process, it is convenient to vary the width of the air gap according to the method of a binary search.

Prior to the measurement, the capacitive sensor may be calibrated such that the amount to which the air contributes to the capacity of the capacitors is eliminated.

In a modified form, the field of application of the method can also been extended to thickness measurements of two-layer films, wherein the contribution of the second film is taken into account by corresponding integrals.

Embodiment examples of the invention will now be explained in conjunction with the drawings, wherein.

Figures 1, 2:
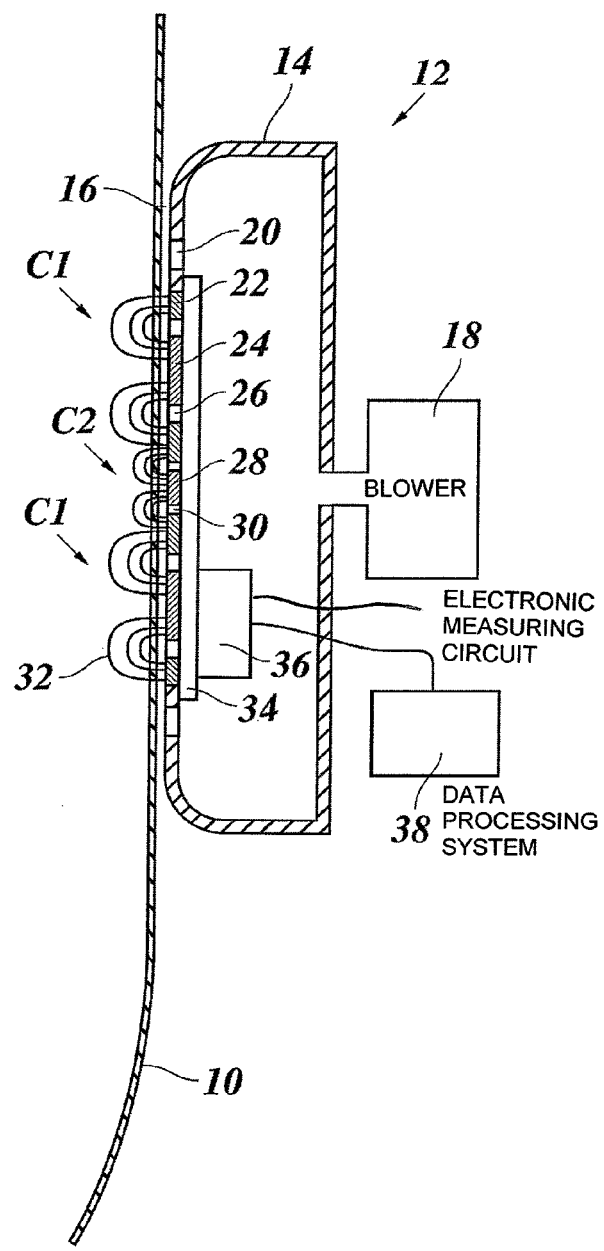
FIG. 1 is a schematic cross-section of a device according to the invention.
FIG. 2 is a front view of a capacitor array in the device according to FIG. 1.

FIG. 1 shows, in a schematic cross-section, a part of a film 10, e.g. a film bubble, which is extruded from a film bubble extruder. The thickness of this film 10 shall be measured contactlessly by means of a capacitive measuring device 12. To this end, a measuring head 14 of the measuring device is arranged at the periphery of the film bubble in such a manner that it forms a narrow air gap 16 with the film that is continuously drawn off upwardly. For stabilising the air gap 16, the measuring head 14 is connected to a blower 18 by which air is blown out from the measuring head 14 in the direction of the film 10 via openings 20 which form a conduit system. The measuring head may slightly be biased against the film, so that the film will "hover" on an air cushion.

Integrated in the wall of the measuring head 14 facing the film 10 is a capacitor array which forms two capacitors C1 and C2. This capacitor array has been shown in a front view in FIG. 2. For reasons of symmetry, the capacitor C1 is formed by two capacitor parts that are arranged symmetrically with respect to the capacitor C2. An outer capacitor plate 22 is common to both capacitors and has two larger cut-outs for the two capacitor parts C1 and a smaller cut-out for the capacitor C2. The two larger cut-outs accommodate inner capacitor plates 24 each of which forms a relatively wide frame-shaped plate gap 26 with the outer plate. The capacitance between the capacitor plates 22 and 24 forms the capacitor C1. Accommodated in the smaller cut-out of the capacitor plate 22 is an inner capacitor plate 28 which forms, with the outer plate, a plate gap 20 that is also frame-shaped but is significantly narrower. The capacitance between the capacitor plates 22 and 28 forms the capacitor C2.

FIG. 1 shows fringe fields 32 of the capacitors C1 and C2 which penetrate through the film 10, so that the capacity of the capacitors is influenced by the film which acts as a dielectric. It can also be seen that the fringe fields of the capacitor C1, due to the wider plate gap 26, penetrate much deeper through the film 10 than the fringe fields of the capacitor C2. Thus, the capacities of the two capacitors are influenced by the film 10 in different ways.

The capacitor plates 22, 24 and 28 are arranged on a circuit board 34 that is accommodated inside the measuring head 14 and also carries an electronic measuring circuit 36. The measuring circuit 36 measures the capacities of the two capacitors C1 and C2 in the known way, and the measurement signals are transmitted to a data processing system 38 where the signals are processed further so as to determine both, the width of the air gap 16 and the thickness of the film 10 on the basis for the measured data. This procedure shall now been explained in greater detail.

Figure 3:
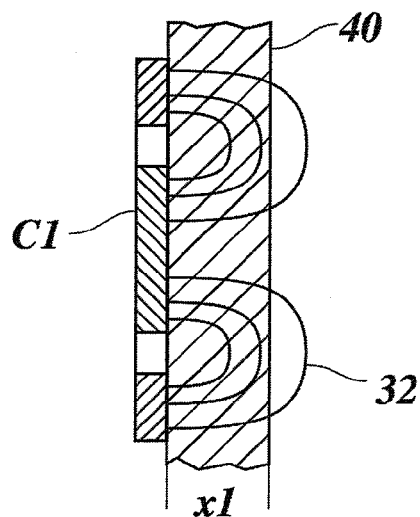
FIG. 3 is a schematic cross-sectional view of a film that is penetrated by the fringe field of a capacitor.
Figure 4:
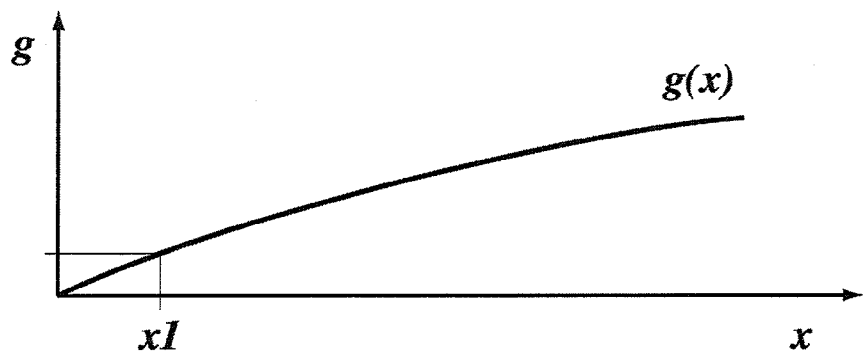
FIGS. 4 and 5 show capacity curves for two capacitors in the capacitor array according to FIGS. 1 and 2.

FIG. 3 shows, in an enlarged cross-section, a part of the capacitor C1 and a film 40 which is in direct engagement with the capacitor plates and has the thickness x1. The capacity of the capacitor C1, which has the larger plate gap, shall now be designated as g. FIG. 4 shows this capacity g as a function of the film thickness x. The capacity increases with increasing film thickness, but the rate of increase becomes ever shallower, because the fringe field 32 decays with increasing distance from the capacitor.

Figure 5:
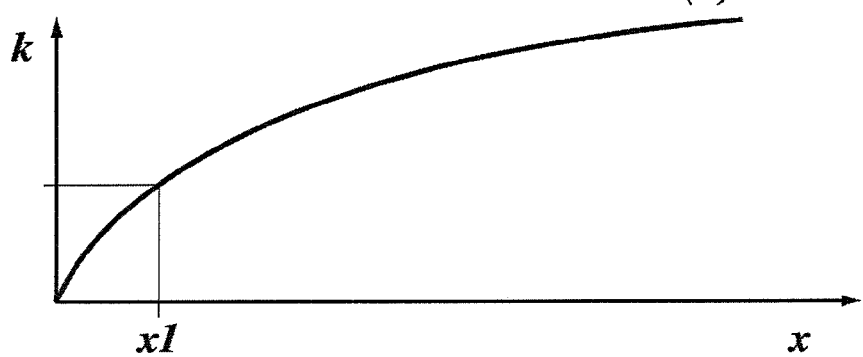

In an analogous way, FIG. 5 shows the capacity k of the capacitor C2, which has the smaller plate gap, as a function of the film thickness x. Here, the first part of the curve is steeper because the field strength at the small plate gap is larger, but then the curve becomes shallower more quickly because the fringe field of the capacitor C2 does not penetrate as deeply into the space and would therefore, in case of a very thick film, no longer reach the zones further away from the capacitor. For this reason, the curve k(x) in FIG. 5 has a larger curvature, whereas the curve g(x) in FIG. 4 is more similar to a straight line.

If the film 40 in FIG. 3 is considered to be made up of a plurality of thin layers, then the total capacity g of the film is composed of the sum of the shares that are contributed by the individual layers. Thus, for the film 40 having the thickness x1, the capacity g can be calculated by integrating the capacity gradient g'(x), i.e. the derivative of g(x) with respect to x, from 0 to x1. Same applies to the capacity k of the capacitor having the smaller plate gap.

Figure 6:
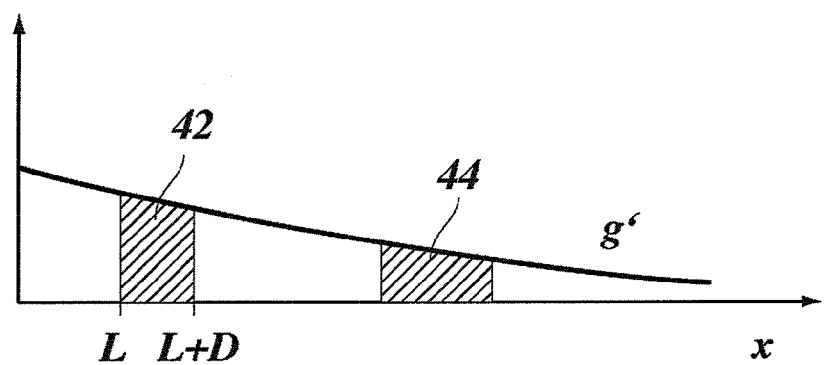
FIGS. 6 and 7 show function graphs which describe the capacity gradients of the two capacitors.
Figure 7:
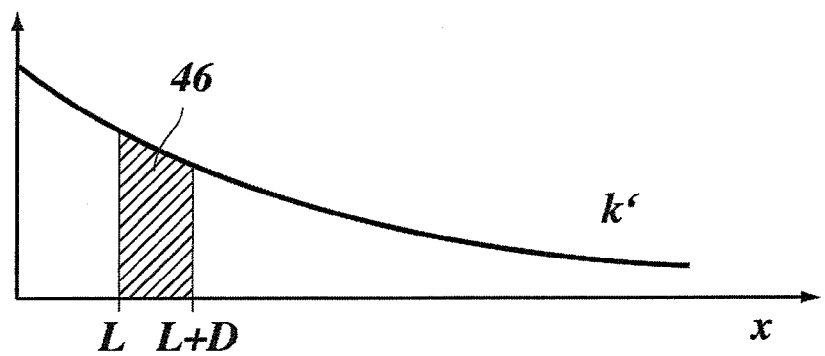
Figure 8:
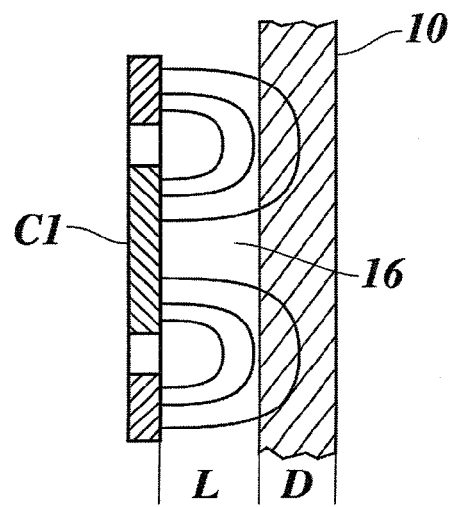
FIG. 8 is a schematic cross-section of a film that is separated from the measuring capacitor by an air gap.

FIGS. 6 and 7 are graphic representations of the capacity gradients g' and k'. FIG. 8 shows, in an illustration similar to FIG. 3, the film 10 forming the air gap 16 with the measuring head. The film 10 has the thickness D, and the air gap 16 has the width L. This configuration is obtained from the configuration shown in FIG. 3 by omitting, among the plurality of layers of which the film 40 is composed, the layers that are closer to the measuring head, and by replacing them with the air gap 16. Consequently, the capacity $g_L$ of the capacitor C1, as determined by the film 10 and the air gap 16, is obtained by integrating the capacity gradient g' (FIG. 6) from L to L+D. The integral and hence the capacity $g_L$ is given by the surface area of the hatched region 42 in FIG. 6.

However, this integral does not permit to determine L and D uniquely, because there are countless combinations of these values which result in the same integral, i.e. the same surface area under the curve, as has been illustrated by the region 44 in FIG. 6.

However, if the integral of the capacity gradient k' for the capacitor C2 and hence the capacity $k_L$, which is measured for the same film 10 and the same air gap 16, is calculated in an analogous way, one disposes of two integrals each of which can be equated with a respective one of the two measured values:

$$g_L = \int_L^{L+D} g'(x)\,dx \tag{1}$$

$$k_L = \int_L^{L+D} k'(x)\,dx \tag{2}$$

The integral in equation (2) corresponds to the surface area 46 in FIG. 7. Normally, the values for L and D can be calculated uniquely from the two equations (1) and (2). The condition for uniqueness will be discussed later.

A possible way of calculating L and D consists of describing the capacity gradients g' and k', which are known for a given configuration of the capacitors, by polynomials, e.g. polynomials of fourth or fifth order. Then, the integrals in equations (1) and (2) may be expressed as algebraic terms, so that one obtains a (non-linear) system of equations with two equations and two unknowns (L and D) which can algebraically be solved for L and D.

As another option, the system of equations may be solved numerically. This can be done, for example, as follows: Start with the (not very realistic) assumption L=0 and calculate at first the integral in equation (1), wherein the integration proceeds from 0 along the x-axis until the integral reaches the measured value $g_L$. The integration boundary that has then been reached gives a preliminary value for the thickness D of the film 10. Then, the integral in equation (2) is calculated numerically from 0 to D. If the assumption L=0 were correct, then the obtained integral would have to coincide with $k_L$. In general, however, this will not be the case, but the integral will be larger than the measured value (because k' is initially very high, see FIG. 7). Then, assume a value for L that is slightly larger than 0 and repeat the procedure described above, with the integration of g' beginning now at L and being continued until the integral reaches the value $g_L$. The integration interval that has bees swept in this way renders a new value for D, which is then checked by means of equation (2). This procedure is now iterated, and L gradually scans the entire range of x-values from 0 to ever larger values, until one finally reaches a value L where both integrals give the correct result.

In practice, the procedure described above would however be relatively intricate and has therefore been described here mainly for the reason that it helps to explain under which conditions the described procedure renders a unique result.

For L=0, as has been described, the value of the integral in equation (2) will be larger than the measured value $k_L$. The value of the integral will then decrease in the amount in which L is increased, until finally $k_L$ is reached. In order for the result to be unique, it must be assured that the value of the integral will not increase again and reach $k_L$ for a second time when L is increased further. That has to say, the function $$\Delta k(L) = \int_{L}^{L+D(L)} k'(x)\,dx$$

must be a monotonously decreasing function of L. Here, D(L) is a function of L because the integration interval is always selected such that equation (1) is fulfilled for the measured value of $g_L$.

Figure 9:
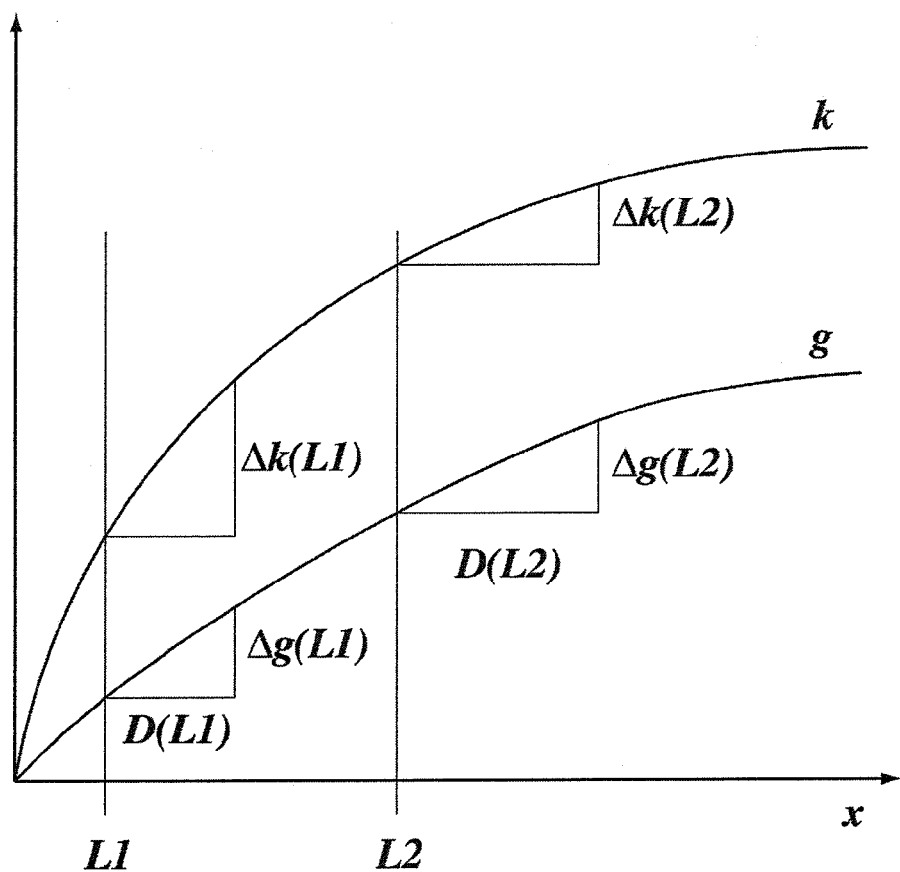
FIG. 9 is a diagram explaining a uniqueness condition for the method according to the invention.

In FIG. 9, the curves g and k from FIGS. 4 and 5 have been shown once again on a different scale and in a common diagram. There, the quantities $\Delta g$, $\Delta k$ (integrals according to equations (1) and (2), respectively) and D (candidate for the film thickness) are considered as functions of the width L of the air gap. D(L) is defined such that $\Delta g$ corresponds to the measured value of $g_L$ for each L.

The uniqueness condition that has been stated above may then also be expressed as follows: For two arbitrary values L1, L2 of L, with L1<L2, the following condition must be fulfilled:

$$\Delta k(L1) > \Delta k(L2)$$

This condition is fulfilled when the curve k in FIG. 9 has a larger curvature than the curve g, i.e. when the following expression is fulfilled for all L1, L2 with L1<L2:

$$\frac{\Delta k(L1)/D(L1)}{\Delta k(L2)/D(L2)} > \frac{\Delta g(L1)/D(L1)}{\Delta g(L2)/D(L2)}$$

This can be shown as follows: With $\Delta g(L1)=\Delta g(L2)=g_L$, division of the above in equation by D(L2) and multiplication with D(L1) results in:

$$\Delta k(L1)/\Delta k(L2) > 1, \text{ and consequently } \Delta k(L1) > \Delta k(L2)$$

The aster the fringe field 32 of the capacitor C2 decays, the larger will be the curvature of the curve k. A fast decay of the fringe field may be achieved on the one hand by reducing the plate gap 30 and on the other hand by decreasing the surface area of the capacitor plate 28. Thus, it can be achieved by suitable configuration of the capacitor plates that the method renders unique results at least in the practically relevant ranges of values of D and L.

A quick and efficient method of numerically determining D and L is based on the known principle of a binary search. Therein, a first value for L is selected to be located in the centre of the relevant range $[L_{min}, L_{max}]$ of possible values, and then, for this value of L, one looks in the manner that has been described above for a value D that fulfils one of the two equations (1) and (2), e.g. the equation (1), and it is checked whether the other equation (2) is also fulfilled. Depending upon whether or not the obtained integral value is smaller or larger than the measured capacity k, a new value L is taken which bisects either the interval $[0, L_{max}/2]$ or the interval $[L_{max}/2, L_{max}]$. In the following iteration steps, the intervals are than bisected again and again, so that good approximations for the actual value of L and hence also the correct value of D are obtained already after few steps.

The method is also suitable for thickness measurements of a double-layer film, wherein the second film layer takes the place of the air gap and thus directly engages the capacitors. Then, determining L corresponds to determining the thickness of the second film layer. In general, however, the dielectric constant of the second material layer must be taken into consideration. The equations (1) and (2) are then replaced by the following equations:

$$g_L = \int_0^L r * g'(x)\,dx + \int_L^{L+D} g'(x)\,dx \quad (1')$$

$$k_L = \int_0^L r * k'(x)\,dx + \int_L^{L+D} k'(x)\,dx \quad (2')$$

wherein r is a constant which represents the ratio of the dielectric constants of the two film layers.

What is claimed is:

1. Method for contactless capacitive thickness measurement of a flat material that is placed in a fringe field of one of two capacitors, with simultaneous measurement of a width of an air gap between the flat material and capacitor plates of the one of two capacitors, comprising the steps of:
   measuring capacities of said two capacitors having fringe fields which decay at different rates towards the flat material with a measuring circuit, and
   determining both the thickness of the flat material and the width of the air gap by searching for two unique values L and D that define distances of opposite surfaces of the flat material from the capacitor plates and are selected such that L and D fulfill a condition that, for each capacitor, a measured capacity is equal to an integral of a capacity gradient from L to L+D, wherein L is the width of the air gap and D is the thickness of the flat material.

2. Method according to claim 1, further comprising the steps of:
   approximating the capacity gradients, as functions of the distance from the capacitors by algebraic function terms, and
   algebraically solving the equations $$g_L = \int_L^{L+D} g'(x)\,dx \quad (1)$$

$$k_L = \int_L^{L+D} k'(x)\,dx, \quad (2)$$

where
   $g_L$ is the measured capacity of a first one of the capacitors,
   $k_L$ is the measured capacity of a second one of the capacitors,
   g' (x) is the capacity gradient of the second one of the capacitors, and
   k' (x) is the capacity gradient of the second one of the capacitors.

3. Method according to claim 1, further comprising the step of numerically calculating the integrals of the capacity gradients.

4. Method according to claim 3, further comprising the step of numerically solving the equations $$g_L = \int_L^{L+D} g'(x)\,dx \quad (1)$$

$$k_L = \int_L^{L+D} k'(x)\,dx, \quad (2)$$

where
   $g_L$ is the measured capacity of a first one of the capacitors,
   $k_L$ is the measured capacity of a second one of the capacitors, g'(x) is the capacity gradient of the first one of the capacitors, and k'(x) is the capacity gradient of the second one of the capacitors.

5. Method according to claim 4, wherein the step of determining both the thickness of the flat material and the width of the air gap by searching for said two unique values L and D further comprises the step of finding a numeric solution according to a principle of a binary search.

6. Apparatus for contactless capacitive thickness measurement of a flat material, comprising:

a measuring head forming an air gap with the flat material, at least two capacitors having fringe fields of which decay towards the flat material at different rates, and a data processing system that is configured to determine both the thickness of the flat material and the width of the air gap by searching for two unique values L and D that define distances of opposite surfaces of the flat material from the capacitor plates and are selected such that L and D fulfill a condition that, for each capacitor, a measured capacity is equal to an integral of a capacity gradient from L to L+D, wherein L is the width of the air gap and D is the thickness of the flat material.

7. Apparatus according to claim 6, wherein the two capacitors have plate gaps with different widths.

8. Apparatus according to claim 6, wherein the capacitors have different surface areas of their capacitor plates.

9. Apparatus according to claim 6, wherein one of the two capacitors has two capacitor plates with like polarity which are surrounded by an outer capacitor plate and are arranged symmetrically with respect to the other capacitor.

10. Apparatus according to claim 6, wherein the measuring head comprises a blower and a conduit system for blowing air into the air gap.

11. A method for capacitive thickness measurement of two material layers disposed adjacent to one another face to face and in a fringe field of one of two capacitor and having different dielectric constants, comprising the steps of:

measuring capacities of said two capacitors which are disposed directly adjacent to one of the two material layers and the fringe fields of the which decay towards the material layers at different rates with a measuring circuit, and determining the thicknesses of both material layers, at least one of which is a flat material, by searching for two unique values L and D that define distances of opposite surfaces of the flat material from the capacitor plates and are selected such that L and D fulfill a condition that, for each capacitor, a measured capacity is equal to an integral of a capacity gradient from L to L+D, wherein L is the thickness of the other material layer and D is the thickness of the flat material.

* * * * *